No. 745,476. Patented December 1, 1903.

UNITED STATES PATENT OFFICE.

JOSHUA A. BELL AND LYNN T. LEET, OF MONTREAL, CANADA, ASSIGNORS TO COMPOSITE STONE AND BRICK COMPANY, A CORPORATION OF DELAWARE.

STEAM-INDURATED STONE.

SPECIFICATION forming part of Letters Patent No. 745,476, dated December 1, 1903.

Application filed November 10, 1902. Serial No. 130,675. (No specimens.)

*To all whom it may concern:*

Be it known that we, JOSHUA A. BELL and LYNN T. LEET, citizens of Canada, residing at Montreal, Canada, have invented a new and useful Improvement in Steam-Indurated Stone, of which the following is a specification.

The object of this invention is to produce an artificial stone for structural or ornamental purposes of superior quality. To accomplish this result, an alkali salt—such as sodium silicate, sodium chlorid, &c.—is used as a binding agent with the main ingredients of the composition, which consist of sand and lime. This binding agent may be applied in a pulverulent form with the other ingredients or may be used in solution in the water with which said ingredients are moistened or some of them may be employed in a vaporized state, being carried by the steam employed in the indurating process.

The process is carried out as follows: After being mixed the ingredients are moistened with water or a suitable solution of the salts mentioned, enough of the liquid being used to slake the lime, if this has not been done before mixing, and to bring the mixture to the proper consistence for molding in a press, which is the next step in the operation. The molded articles are then indurated by means of steam or steam and water. When the articles are subjected to steam under pressure, this is preferably done in a cylinder provided with appliances for introducing steam or water at will to the contents thereof. In the preparation of the materials the closest grain and the best results otherwise are obtained by grinding the mixture of materials to the fineness of hydraulic cement.

It is found advantageous in some of the combinations of ingredients, while the articles are in the indurating-cylinder, to simultaneously slake in the same chamber an approximately equal quantity of lime to that contained in the articles being indurated by the action of the steam employed in the indurating process.

The following may be given as an illustration of our invention: We mix ninety-four per cent. of sand, one per cent. of sodium chlorid, and five per cent. of slaked lime, all in a dry state. Sufficient water is added to make the particles of the mixture adhere. To impart increased strength to the artificial stone produced, a small portion of the sand, from one per cent. to ten per cent., may be replaced by hydraulic cement. The mixture is then molded into stones or bricks of the required shape, greater or less pressure being used, according to the density of the finished product desired. The stones or bricks are then introduced into an indurating-cylinder with an equivalent amount of quicklime in a separate receptacle located at the top of the cylinder, so as not to be flooded when the bricks are subsequently submerged in water or indurating liquid. The cylinder is then closed and steam at a pressure of about one hundred and twenty pounds or more is introduced for from three to six hours. The steam is then shut off and water or indurating liquid is added in quantity just enough to cover the bricks. After about half an hour to an hour the water is drained from the cylinder. The steam is then again turned on for from two to fifteen hours to complete the induration of the stones—that is to say, to thoroughly harden the same. If desired, there may be substituted for the whole or part of the sand an equal weight of ground slag or other similar hard material. If sand is used which carries moisture, the quicklime used will gradually slake by combining with this moisture, and thus the mixture is more easily pulverized.

After the steam induration in the cylinder the stones or bricks may be further hardened by immersion in water, after which they are dried.

What we claim as new is—

1. The process of making artificial stone, consisting in mixing the constituent ingredients, adding only enough moisture to make the particles of the ingredients adhere, molding the mixture into articles of desired shape, partially steam-indurating the same, and then applying an indurating liquid further to increase the hardness of the materials.

2. The process of making artificial stone, consisting in mixing sand, slaked lime and an alkali salt, adding enough moisture to make the particles of the ingredients adhere and to retain a given form, forming the mixture into articles of desired shape and steam-indurating the same.

3. The process of making artificial stone, consisting in mixing sand, slaked lime, hydraulic cement and an alkali salt, adding enough moisture to make the particles of the ingredients adhere and to retain a given form, forming the mixture into articles of desired shape and steam-indurating the same.

4. The process of making artificial stone consisting in mixing sand, slaked lime and an alkaline silicate, adding enough moisture to make the particles of the ingredient adhere and to retain a given form, forming the mixture into articles of desired shape, and steam-indurating the same.

In testimony whereof we have signed our names to this specification, in the presence of two subscribing witnesses, this 1st day of November, 1902.

JOSHUA A. BELL.
LYNN T. LEET.

Witnesses:
B. F. KEINARD,
JOHN H. GALLAGHER.